US006205428B1

(12) United States Patent
Brown et al.

(10) Patent No.: US 6,205,428 B1
(45) Date of Patent: *Mar. 20, 2001

(54) CONFUSION SET-BASE METHOD AND APPARATUS FOR PRUNING A PREDETERMINED ARRANGEMENT OF INDEXED IDENTIFIERS

(75) Inventors: Deborah W. Brown, Manalapan; Randy G. Goldberg, Princeton; Piyush C. Modi, Flemington; Richard R. Rosinski, Middletown, all of NJ (US)

(73) Assignee: AT&T Corp., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 08/975,588

(22) Filed: Nov. 20, 1997

(51) Int. Cl.[7] .................................................. G10L 15/00
(52) U.S. Cl. .......................... 704/270; 704/275; 704/251; 455/563
(58) Field of Search ..................................... 704/256, 255, 704/270, 243, 275, 251; 455/563

(56) References Cited

U.S. PATENT DOCUMENTS

| | | |
|---|---|---|
| 3,466,394 | 9/1969 | French . |
| 3,752,904 | 8/1973 | Waterbury . |
| 3,896,266 | 7/1975 | Waterbury . |
| 3,988,715 | 10/1976 | Mullan et al. . |
| 4,718,102 | 1/1988 | Crane et al. . |
| 4,783,804 | 11/1988 | Juang et al. ........................ 704/245 |
| 4,817,156 * | 3/1989 | Bahl et al. ......................... 704/256 |
| 4,819,271 | 4/1989 | Bahl et al. ......................... 704/256 |
| 4,908,865 | 3/1990 | Doddington et al. ............... 704/272 |
| 5,023,912 | 6/1991 | Segawa .............................. 381/43 |
| 5,027,406 | 6/1991 | Roberts et al. ..................... 381/43 |
| 5,034,989 | 7/1991 | Loh .................................... 382/189 |
| 5,050,215 * | 9/1991 | Nishimura .......................... 704/244 |
| 5,101,345 | 3/1992 | MacPhail ............................ 707/1 |
| 5,125,022 | 6/1992 | Hunt et al. ......................... 379/88 |
| 5,127,043 | 6/1992 | Hunt et al. ......................... 379/88 |
| 5,167,016 | 11/1992 | Bagley et al. ...................... 395/144 |
| 5,179,718 | 1/1993 | MacPhail ............................ 707/514 |
| 5,216,720 | 6/1993 | Naik et al. ......................... 704/272 |
| 5,255,310 | 10/1993 | Kim et al. .......................... 379/88 |

(List continued on next page.)

FOREIGN PATENT DOCUMENTS

| | | |
|---|---|---|
| 0 319 193 A2 | 6/1989 | (EP) . |
| WO 96 10795 | 4/1996 | (WO) . |
| 96 36042 | 11/1996 | (WO) . |

OTHER PUBLICATIONS

L.G. Kersta; "Voiceprint Identification"; Bell Telephone Laboratories, Inc., Murray Hill, NJ; Nature; Dec. 29, 1962; pp. 1253–1257.

Joseph P. Campbell, Jr.; "Speaker Recognition: A Tutorial"; Proceedings of the IEEE, vol. 85, No. 9, Sep., 1997; pp. 1437–1462.

Primary Examiner—David R. Hudspeth
Assistant Examiner—Susan Wieland
(74) Attorney, Agent, or Firm—Kenyon & Kenyon (57) ABSTRACT

A method and apparatus for reducing a set of reference identifiers to a candidate subset of reference identifiers. The reference identifiers are associated in memory with a plurality of index codes. A user provides an input identifier, causing a recognizing device of the present invention to produce a recognized identifier on the basis of the input identifier. The present invention determines an index code based on the recognized identifier and on the basis of a plurality of pre-stored confusion sets of characters that group together in individual confusion sets those characters having a relatively high likelihood of being confused with each other by the recognizing device. After matching the determined index code with one of the reference index codes, the present invention determines which reference index codes are within a predetermined distance of the matched reference index code. The reference identifiers that are associated with these reference index codes constitute the candidate subset of reference identifiers.

19 Claims, 6 Drawing Sheets

U.S. PATENT DOCUMENTS

| | | | |
|---|---|---|---|
| 5,274,560 | 12/1993 | LaRue | 364/444 |
| 5,283,833 | 2/1994 | Church et al. | 381/41 |
| 5,297,194 | 3/1994 | Hunt et al. | 379/88 |
| 5,303,299 | 4/1994 | Hunt et al. | 379/88 |
| 5,365,574 | 11/1994 | Hunt et al. | 379/88 |
| 5,384,833 | 1/1995 | Cameron | 704/275 |
| 5,418,717 | 5/1995 | Su et al. | 364/419.08 |
| 5,452,397 | 9/1995 | Ittycheriah et al. | 395/2.49 |
| 5,454,062 | 9/1995 | LaRue | 395/2.63 |
| 5,455,889 | 10/1995 | Bahl et al. | 704/236 |
| 5,465,290 | 11/1995 | Hampton et al. . | |
| 5,497,319 | 3/1996 | Chong et al. | 364/419.02 |
| 5,499,288 | 3/1996 | Hunt et al. | 379/88 |
| 5,502,774 | 3/1996 | Bellegarda et al. | 382/159 |
| 5,504,805 | 4/1996 | Lee | 379/67 |
| 5,509,104 | 4/1996 | Lee et al. | 395/2.65 |
| 5,517,558 | 5/1996 | Schalk | 379/88 |
| 5,519,786 * | 5/1996 | Courtney et al. | 382/159 |
| 5,526,465 | 6/1996 | Carey et al. | 704/250 |
| 5,535,120 | 7/1996 | Chong et al. | 364/419.03 |
| 5,566,272 | 10/1996 | Brems et al. | 704/231 |
| 5,577,164 | 11/1996 | Kaneko et al. . | |
| 5,613,109 | 3/1997 | Yamauchi et al. | 395/6.15 |
| 5,623,578 | 4/1997 | Mikkilineni | 704/255 |
| 5,623,609 | 4/1997 | Kaye et al. | 704/1 |
| 5,640,490 | 6/1997 | Hansen et al. | 704/254 |
| 5,642,519 | 6/1997 | Martin . | |
| 5,655,058 * | 8/1997 | Balasubramanian et al. | 704/236 |
| 5,675,647 | 10/1997 | Garneau et al. | 380/20 |
| 5,675,704 | 10/1997 | Juang et al. | 704/246 |
| 5,675,706 | 10/1997 | Lee et al. | 704/256 |
| 5,677,989 | 10/1997 | Rabin et al. . | |
| 5,677,990 | 10/1997 | Junqua | 704/231 |
| 5,680,509 | 10/1997 | Gopalakrishnan et al. | 704/270 |
| 5,680,511 | 10/1997 | Baker et al. | 395/2.66 |
| 5,687,287 | 11/1997 | Gandhi et al. | 704/247 |
| 5,729,656 * | 3/1998 | Nahamoo et al. | 704/254 |
| 5,745,555 | 4/1998 | Mark | 379/93.03 |
| 5,748,840 | 5/1998 | La Rue | 704/231 |
| 5,754,695 | 5/1998 | Kuo et al. . | |
| 5,764,799 | 6/1998 | Hong et al. | 382/225 |
| 5,769,527 | 6/1998 | Taylor et al. | 362/85 |
| 5,781,882 * | 7/1998 | Davis et al. | 704/221 |
| 5,784,631 * | 7/1998 | Wise | 395/800 |
| 5,794,042 | 8/1998 | Terada et al. | 395/701 |
| 5,797,123 | 8/1998 | Chou et al. . | |
| 5,799,269 | 8/1998 | Schabes et al. | 704/9 |
| 5,802,205 * | 9/1998 | Emico et al. | 382/187 |
| 5,806,040 | 9/1998 | Vensko . | |
| 5,818,952 | 10/1998 | Takenouchi et al. | 382/101 |
| 5,829,000 | 10/1998 | Huang et al. | 704/252 |
| 5,832,063 | 11/1998 | Vysotsky et al. . | |
| 5,841,901 | 11/1998 | Arai et al. | 382/187 |
| 5,850,480 | 12/1998 | Scanlon | 382/229 |
| 5,870,492 | 2/1999 | Shimizu et al. | 382/187 |
| 5,875,108 | 2/1999 | Hoffberg et al. | 364/146 |
| 5,889,897 | 3/1999 | Medina | 382/309 |
| 5,903,864 | 5/1999 | Gadbois et al. | 704/251 |
| 5,913,196 | 6/1999 | Talmor et al. . | |
| 5,937,385 | 8/1999 | Zadrozny et al. . | |

* cited by examiner

CONFUSION SET 1: AJK
CONFUSION SET 2: EBCDPTV
CONFUSION SET 3: SFX
CONFUSION SET 4: IROL
CONFUSION SET 5: MN
CONFUSION SET 6: W
CONFUSION SET 7: H

CONFUSION SET-BASE METHOD AND APPARATUS FOR PRUNING A PREDETERMINED ARRANGEMENT OF INDEXED IDENTIFIERS

CROSS-REFERENCE TO RELATED APPLICATIONS

The present application is related to the following commonly assigned U.S. patent applications: Ser. No. 08/763,382, filed Dec. 13, 1996, entitled "Statistical Database Correction Of Alphanumeric Account Numbers For Speech Recognition And Touch-Tone Recognition;" Ser. No. 08/771,356, filed Dec. 16, 1996, entitled "Constrained Alpha-Numerics For Accurate Account Number Recognition;" Ser. No. 08/909,199, filed Aug. 11, 1997, entitled "A Confusion Matrix Based Method And System For Correcting Misrecognized Words Appearing In Documents Generated By An Optical Character Recognition Technique;" Ser. No. 08/909,200, filed Aug. 11, 1997, entitled "Method And Apparatus For Performing An Automatic Correction Of Misrecognized Words Produced By An Optical Character Recognition Technique By Using A Hidden Markov Model Based Algorithm;" Ser. No. 08/953,579, filed Oct. 17, 1997, entitled "Method And Apparatus For Accessing Pre-Defined Grammars;" Ser. No. 08/953,469, filed Oct. 17, 1997, entitled "Method And Apparatus For Minimizing Grammar Complexity;" Ser. No. 08/953,468, filed Oct. 17, 1997, entitled "Method And Apparatus For Performing A Grammar-Pruning Operation;" and Ser. No. 08/975,587, entitled "Method And Apparatus For Performing A Name Acquisition Based On Speech Recognition," and Ser. No. 08/975,589, entitled "Check-Sum Based Method And Apparatus For Performing Speech Recognition," filed concurrently herewith.

BACKGROUND INFORMATION

The present invention is directed to a method and apparatus that reduces a set of stored reference identifiers to a candidate subset of reference identifiers, and, in particular, to a method and apparatus that achieves this reduction by first pruning a set of reference index codes associated with the reference identifiers on the basis of an input identifier provided by a user.

Most institutions, such as banks, department stores, and airlines, allow customers to access over the telephone a wide variety of services and information. Before the advent of touch-tone telephones, a customer would obtain these services and information through interacting with a live operator. As touch-tone telephones became more prevalent in homes, these institutions began switching to automated customer-access systems. After dialing a telephone number, a customer using such systems would be asked to enter an account number, or some other identifier. The user would enter the account number through the keys of a touch-tone keypad. As used herein, the term "identifier" refers to a string of characters that may comprise a plurality of letters, numbers, or both; based on this definition, an identifier may comprise either a random aggregation of characters, an actual word, or the name of a place or a person. Furthermore, as used herein, an identifier may comprise, but is not limited to, a string of characters for identifying a particular product, service, location, or account information.

Today, a user can provide such an identifier to an institution through a number of ways besides touch-tone telephony, including by speaking the identifier into the telephone handset. When the user is prompted to speak the identifier, the institution uses a speech recognition system to produce a recognized identifier based on the spoken identifier. Regardless of how the user enters the identifier, however, once a recognized signal representative of the input identifier has been received at the institution, the institution must match the recognized signal with one of a plurality of pre-stored identifiers, which are also referred to as reference identifiers. After a match between the input identifier and a reference identifier is found, the institution performs a transaction based on the matched reference identifier, such as retrieving account information or ordering a specific product. Finding such a match may take some time, however, since institutions often maintain thousands, if not millions, of reference identifiers. Moreover, the more reference identifiers that an institution must search through in order to find a match with an input identifier, the less accurate this search becomes, especially when the reference identifiers are alphanumeric, which tend to be confused with one another. Matching input identifiers with the wrong reference identifiers at least leads to delays and customer dissatisfaction, and perhaps also to erroneous billing or even to divulging sensitive, confidential information. What is therefore needed is a system that maintains a high degree of accuracy in matching input identifiers with reference identifiers, even when the total number of reference identifiers is quite large, by carrying out a procedure that reduces the total number of reference identifiers to a smaller, more manageable candidate subset of reference identifiers. Since the candidate subset of reference identifiers may include substantially fewer reference identifiers than the total set of reference identifiers, a system that uses the present invention to match an input identifier with a reference identifier will do so more quickly and with a higher degree of accuracy.

SUMMARY OF THE INVENTION

The present invention is directed to a method and apparatus that reduces a set of reference identifiers to a candidate subset of reference identifiers on the basis of an input identifier provided by a user. Each of the reference identifiers is associated with one of a plurality of reference index codes. After receiving the input identifier, the present invention provides a recognized identifier based on the input identifier. The present invention also provides a plurality of confusion sets; each confusion set groups together those characters that have a relatively high likelihood of being confused with one another. After providing the recognized identifier, the present invention determines an index code for the recognized identifier on the basis of the recognized identifier and the plurality of confusion sets. This index code may comprise a digital word comprising a plurality of bits divided into segments. Each segment of the index code is associated with one of the confusion sets, and each segment of the index code encodes the number of characters of the associated confusion set that appears in the recognized identifier. The present invention then determines which of the plurality of reference index codes are within a predetermined distance of the index code for the recognized identifier. The candidate set of reference index codes comprises those index codes that are within the predetermined distance to the index code of the recognized identifier. Moreover, the reference identifiers associated with the candidate set of reference index codes constitute the candidate set of reference identifiers. By reducing a set of reference identifiers to a reduced candidate set of reference identifiers in the above-described manner, the present invention reduces the processing time for finding a match to the recognized identifier, and also enhances the accuracy of finding such a match.

DETAILED DESCRIPTION

Figure 1:
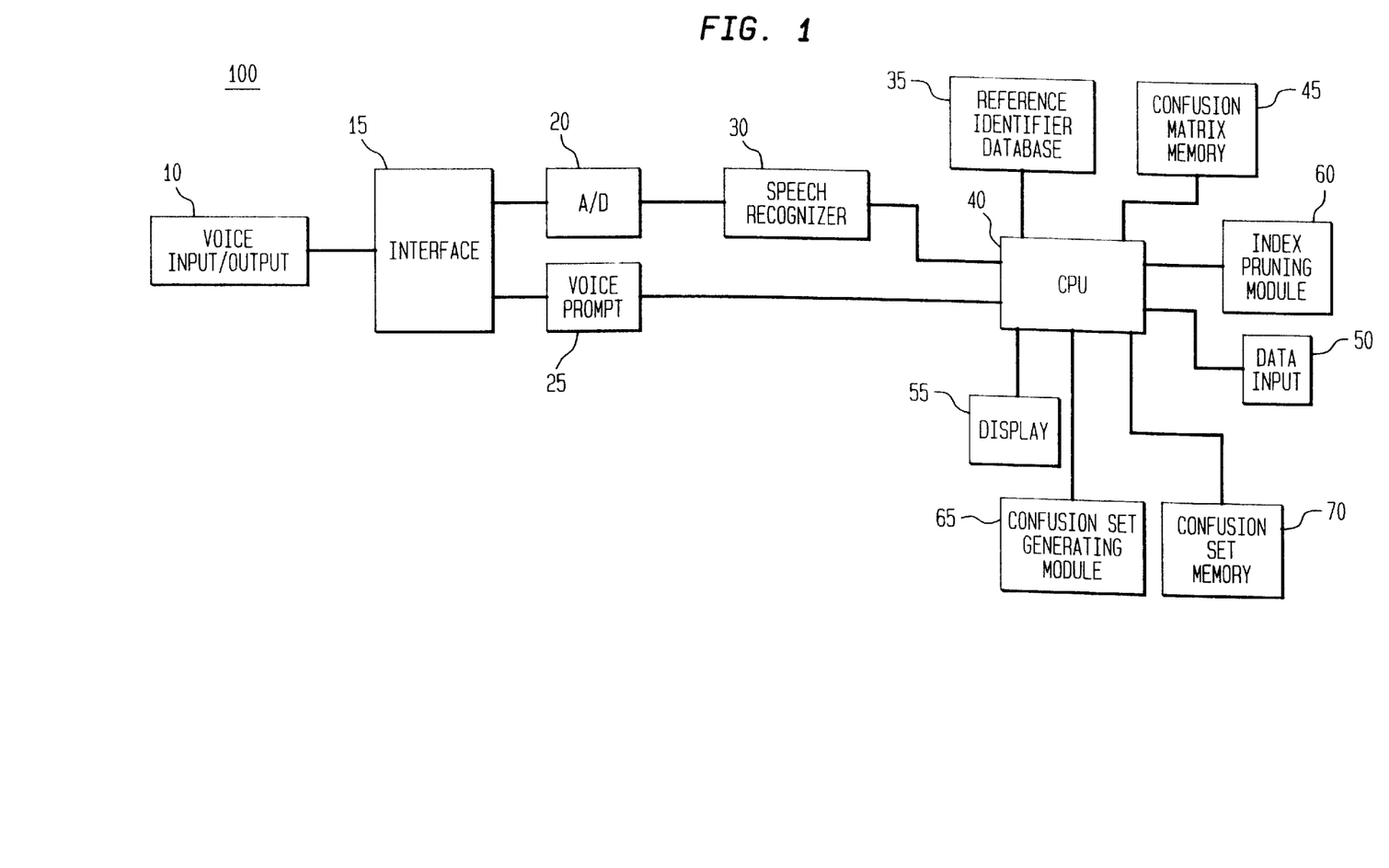
FIG. 1 illustrates a block diagram of an apparatus in accordance with an embodiment of the present invention.

FIG. 1 illustrates a system 100 that implements the confusion set-based method of the present invention. The system of FIG. 1 is merely an example of one kind of system that is capable of supporting the present confusion set-based routine, and it should be appreciated that the present confusion set-based routine is compatible with numerous other applications.

The system 100 of FIG. 1 includes a voice input/output device 10, which may comprise a conventional telephone, or any other known device capable of converting an audible vocal signal to an electrical signal and vice versa. Connected to the voice input/output device 10 is an interface 15 that interfaces the voice input/output device 10 to the remaining components of system 100. The interface 15 may comprise a conventional public switched telephone network ("PSTN"). Of course, an interface is necessary only if the voice is to be transmitted to a remote location for processing; as an alternative, the components of system 100 may be provided in a unitary apparatus, save for the interface 15. The present invention is intended to encompass both types of systems. After the voice signal is converted to a digital signal by an analog-to-digital ("A/D") converter 20, the digitized voice signal is provided to a speech recognizer 30, which may comprise a HARKTM™ 3.0 recognizer, for example. After employing a suitable speech recognition routine, which may, for example, be based on the Hidden Markov Model, speech recognizer 30 provides a recognized output that is intended to correspond to the information that the user spoke into the voice input/output device 10. This recognized output, which is in the form of a well-known digital code, is referred to as a recognized "identifier," and it is provided to an input of CPU 40. Coupled to CPU 40 are a reference identifier database 35, a confusion matrix memory 45, an index pruning module 60, a confusion set generating module 65, and a confusion set memory 70. Also coupled to CPU 40 are data input device 50 and display 55. Data input device 50 may comprise a keyboard, a floppy disk drive, a CD-ROM drive, or any other component that is suitable for delivering external data to system 100. The system 100 also includes a voice prompt device 25, which provides, under the control of CPU 40, audible voice prompts that are intended to guide a user through the operation of system 100.

During operation, the system 100 accepts a particular spoken identifier through voice input/output device 10. For example, the user may spell a particular identifier, which may be in the form of a name. Of course, the system 100 is not limited to processing names; instead, the present invention is flexible enough to process any combination of letters, numbers, or typographical characters. Thus, the present invention is compatible with names, words, or account numbers, for example. These combinations of characters, letters, and numbers are referred to herein as identifiers. The recognizer 30 accepts a digitized voice signal based on the spoken identifier and produces a recognized identifier that is intended to match the spoken identifier. Reference identifier database 35 contains a plurality of reference identifiers, the arrangement of which shall be discussed in due course. The present discussion shall assume that the reference identifiers stored in reference identifier database 35 are names. Since the amount of reference identifiers maintained in database 35 may be very large, attempting to match the recognized identifier to one of the reference identifiers of database 35 is time-consuming and may be insufficiently accurate. Through the operation of the confusion set generating module 65 and the index pruning module 60, the number of reference identifiers to which the recognized identifier is compared is reduced to a more manageable amount, one which improves the recognition accuracy of the system 100 and reduces processing time.

Although the principles of the present invention are discussed herein within the context of a speech recognition system, it should be appreciated that the present invention may also rely on touch-tone telephone signaling to produce the recognized identifier. In this type of system, a user would enter the characters of the identifier by manipulating an appropriate set of keys on a telephone handset. Speech recognizer 30 would be replaced by any suitable device, commonly available in current touch-tone recognition systems, that would produce a recognized identifier based on the entered touch-tone signals.

Figure 2:
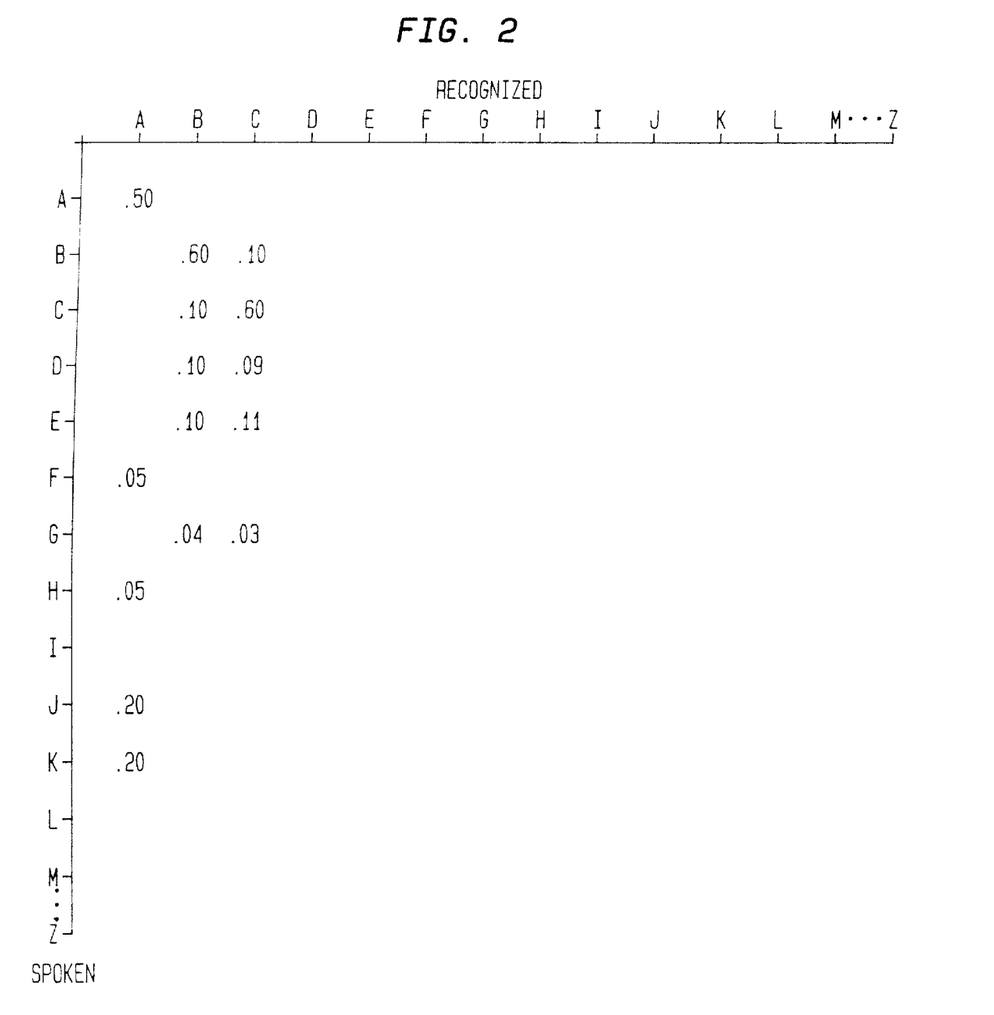
FIG. 2 illustrates a confusion matrix maintained in the confusion matrix memory of the apparatus of FIG. 1.

The confusion matrix memory 45 stores a plurality of recognition probabilities arranged in matrix form. An example of a confusion matrix is illustrated in FIG. 2. In the example of FIG. 2, each recognition probability is provided in the form of a decimal value. Each recognition probability represents the probability that a particular letter spoken by a user into voice input/output device 10 will be recognized by recognizer 30 either as the same letter or as another letter. For example, the confusion matrix is intended to provide a probability that, when "A" is spoken into device 10, the recognizer 30 will yield an "A", or a "B", a "C", etc., for that particular spoken letter. Although in practice the confusion matrix stored in memory 45 would cover the entire alphabet, for the sake of simplicity and ease of understanding, the confusion matrix of FIG. 2 only covers a portion of the alphabet. Other possible confusion matrices may cover, in addition to letters, numbers, and other characters as well. Moreover, in the example of FIG. 2, where no entry is provided, the blank entry should be read as a zero. In practice, however, the entire matrix may be populated with recognition probabilities.

The confusion matrix of FIG. 2 is read as follows: the vertical columns correspond to characters that are produced by recognizer 30. The horizontal rows correspond to characters of words that are spoken by a user into voice input/ output device 10. Of course, the confusion matrix of FIG. 2 may be configured in reverse, in which the horizontal rows correspond to characters produced by recognizer 30, and in which the vertical columns correspond to characters that are spoken by the user. The values that are provided in the confusion matrix represent different probabilities. For example, based on the confusion matrix of FIG. 2, given that the letter "A" is produced by recognizer 30, the probability that "A" was spoken by the user is 50%. The column for the letter "A" also reveals that speaking an "A" will produce a probability of 5% that recognizer 30 will yield an "F" in response, a probability of 5% that the recognizer 30 will yield an "H", a probability of 20% that recognizer 30 will yield a "J", and a probability of 20% that recognizer 30 will yield a "K". Letters that are pronounced similarly are more likely to be confused with each other, and the values that populate the confusion matrix of FIG. 2 reflect that observation. That is why, since "A" and "J" sound alike when pronounced, the recognition probability that a spoken "A" will be misrecognized by recognizer 30 as "J" (20%) is higher than the recognition probability that a spoken "A" will be misrecognized by recognizer 30 as an "F" (5%).

The particular probabilities that are provided in FIG. 2 are determined in advance through experimentation, and they are tailored to suit the particular recognizer 30. Thus, before a particular recognizer is to be used in the system of FIG. 1, a confusion matrix corresponding to that particular recognizer must first be populated. Thus, when a particular recognizer is to be used in the system of FIG. 1, a test group of persons repetitively provides pronunciations of each of the letters and numerals to be included in the confusion matrix, and the recognized output of recognizer 30 for each pronunciation is recorded. In order that the results of these tests incorporate the influence of the noise and bandwidth limitations that affect speech recognizers operating under real conditions, the vocal pronunciations of this test group of persons may be provided to the speech recognizer 30 over a telephone line. From these various "trial runs" of speech recognizer 30, the probabilities that characterize the recognition accuracy of the speech recognizer 30 are established, and these probabilities can be entered as a confusion matrix into memory 45 through data input device 50. Since different recognizers exhibit different recognition accuracies, if speech recognizer 30 is to be replaced with a different recognizer, a confusion matrix corresponding to the replacement recognizer may be entered into memory 45. Or, alternatively, memory 45 may store in advance a plurality of predetermined confusion matrices corresponding to different recognizers, so that when a replacement recognizer is implemented, the corresponding confusion matrix may be accessed by entering a command through input device 50. It should be noted that the probabilities of a confusion matrix need not be arranged in matrix form, but may be arranged as an array, or as any other data structure capable of associating a recognized and spoken character in terms of a probability.

Figure 3:
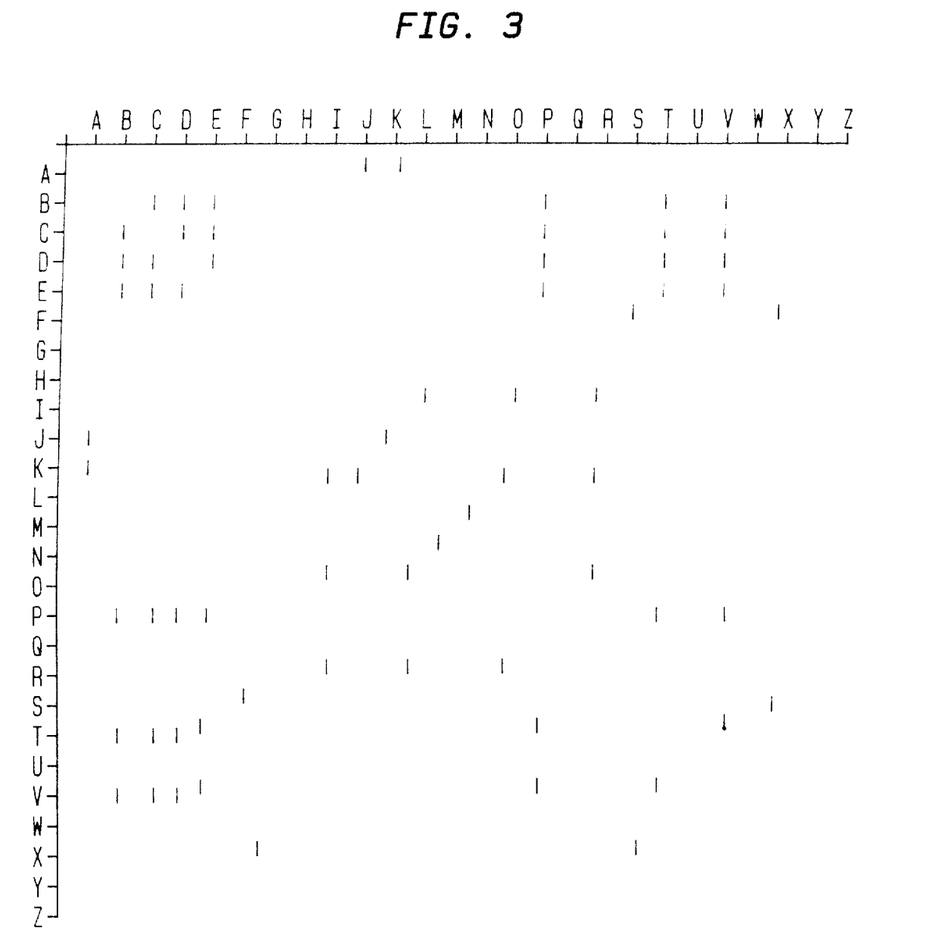
FIG. 3 illustrates a connectivity matrix for generating confusion sets.
Figure 4:
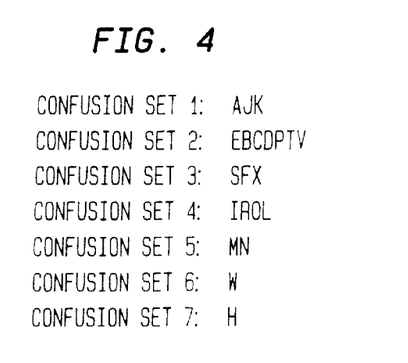
FIG. 4 illustrates an exemplary arrangement of confusion sets.

In order to discuss the manner in which a plurality of confusion sets are generated, reference is now made to FIGS. 3 and 4. FIG. 3 illustrates what is referred to as a connectivity matrix, from which a plurality of confusion sets may be obtained. An example of a plurality of confusion sets is shown in FIG. 4. Each confusion set is intended to group together those letters that are most likely to be confused with each other. Within the context of a speech recognition system, the letters that are most often confused with each other are the letters that are pronounced the most similarly. The manner in which these confusion sets are generated is such that characters from different confusion sets have a relatively low probability of being confused with each other. As shall be explained in connection with FIG. 3, the determination of which letters should be grouped together is based on the recognition probabilities arranged in the confusion matrix of memory 45. In FIG. 4, confusion set 1 groups together the letters "A", "B", and "C". Confusion set 2 groups together the letters "B", "C", "D", "E", "P", "T", and "V". Confusion set 3 comprises the letters "S", "F", and "X". Confusion set 4 comprises the letters "I", "R", "O", and "L". Confusion set 5 comprises the letters "M" and "N". Confusion set 6 comprises the letter "W", and confusion set 7 comprise the letter "H".

Operating in accordance with the instructions provided by confusion set generating module 65 and in accordance with the confusion matrix provided in memory 45, CPU 40 performs the necessary calculations and procedures for generating the confusion sets, and once generated, these confusion sets are maintained in memory 70. The first step in generating the confusion sets involves generating a matrix based on the confusion matrix that corresponds to the speech recognizer 30 currently in use. In particular, each entry location (i.e., the intersection point of row X with column Y) of the newly generated matrix is populated with a value of 1 if the same entry location in the confusion matrix is populated with a recognition probability that is greater than a predetermined threshold. For those entry locations of the confusion matrix having recognition probabilities that are less than or equal to the threshold, the corresponding entry locations of the newly generated matrix receive a value of 0. The threshold is determined empirically according to any suitable method, and it reflects the recognition characteristics of the speech recognizer associated with the confusion matrix. The newly generated matrix that results from this procedure is a matrix that comprises only ones and zeroes. This matrix is then multiplied by itself a number of times equal to the amount of characters represented by the confusion matrix. Thus, if the confusion matrix covers the entire alphabet, which includes twenty-six letters, then the ones-and-zeroes matrix is multiplied by itself twenty-six times. The product of this multiplication is referred to as a connectivity matrix, an example of which is illustrated in FIG. 3.

The distribution of characters among the various confusion sets depends on the distribution of ones in the connectivity matrix. Everywhere in the connectivity matrix that there is a "one," the letters of the associated row and column are included in the same confusion set. For example, in FIG. 3, the column corresponding to the letter "A" includes a "one" at the rows corresponding to the letters "J" and "K". Thus, the letters "A", "J", and "K" are placed within one confusion set. For column "B", "ones" are associated with rows "C", "D", "E", "P", "T", and "V". Thus, the letters "B", "C", "D","E", "P", "T", and "V" are included in another confusion set. This process is repeated until each character represented in the original confusion matrix is associated with a confusion set. The confusion sets of FIG. 4 represent one possible arrangement that the above-discussed process may yield.

It should be appreciated that this confusion set generation need not be performed after the system is put in practice, but instead may be accomplished before the system 100 begins interacting with users. Moreover, every time a new recognizer is installed, and consequently, a new associated confusion matrix is activated, the system 100 requires a corresponding new plurality of confusion sets to be generated. Of course, each different plurality of confusion sets may be generated beforehand, so that if a new speech recognizer is implemented, the appropriate plurality of confusion sets may be activated by entering a command through data input device 50. Further, the above-discussed procedure is not the only way to generate a plurality of confusion sets; the present invention is intended to encompass any suitable process for grouping the most often confused letters with one another. Thus, for example, had the system 100 been programmed to store recognition probabilities according to a data structure other than a confusion matrix, the present invention would encompass whatever technique is suitable for that data structure for determining which groups of letters are most often confused with one another.

Figure 5A:
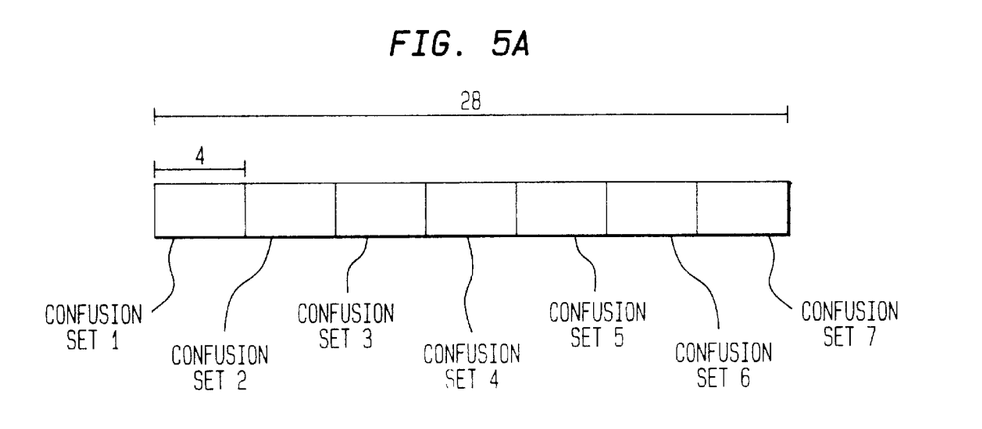
FIGS. 5(a) and 5(b) illustrate alternative exemplary formats for the index codes used by the apparatus of FIG. 1.

As explained before, reference identifier memory 35 may be programmed to store a vast amount of reference identifiers, vast enough to embrace millions of reference identifiers. Assume for this discussion that the system 100 is programmed to process names. Each of the names in the reference identifier 35 is associated with an index. The index codes that are associated in reference identifier database 35 with reference identifiers may be referred to as reference index codes. An index is a digital word comprising a plurality of bits; an index encodes for its associated name or names how many letters from each confusion set is included in the associated name or names. An exemplary index code is shown in FIG. 5(a). This index comprises 28 bits total; the index is divided into seven segments, each comprising four bits. Each segment is associated with a particular confusion set. Each segment is intended to encode, for the corresponding name, the number of letters of the associated confusion set that appears in the name Thus, the number of segments is equal to the number of confusion sets; had the confusion set memory been supplied with only 5 sets, then each index code would comprise five segments. Moreover, the number of bits that constitute each segment is of course not limited to four bits; each segment can be predetermined to comprise whatever number of bits is appropriate to the application at hand. Moreover, the amount of bits for each segment need not be the same for every index; the present invention contemplates segments of variable data lengths.

To illustrate how the contents of each index are encoded, assume that one of the names stored in reference identifier database 35 is BROWN. With respect to segment 1, which is associated with confusion set 1, none of the letter of confusion set 1 appears in the name BROWN; therefore, segment 1 is encoded as the binary code "0000". For segment 2, one letter of the second confusion set, "B", appears in BROWN; therefore, segment 2 is encoded as binary "0001". No letter from confusion set 3 appears in BROWN; therefore, segment 3 is encoded as binary "0000". The letters "R" and "O" of confusion set 4 appear in BROWN; therefore, segment 4 is encoded as binary "0010". As for confusion set 5, the letter "N" appears in BROWN; therefore, segment 5 is encoded as binary "0001". Segment 6 is also encoded as binary "0001" because the letter "W" appears in BROWN. Since BROWN does not include the letter "H", the sole letter included in confusion set 7, segment 7 is encoded as binary "0000". When each of the segments are concatenated together to form an index for BROWN, the index appears as:

0000 0001 0000 0010 0001 0001 0000

In reference database 35, not only is the name BROWN associated with this index, but every name that yields the data contents of this index is also associated with the same index as BROWN. Thus, in reference identifier database 35, each index is associated with all of the names that yield the particular data contents of that index. This arrangement of names is pre-programmed into database 35 before it is put in use. Since each recognizer is characterized by a different confusion matrix, changing the recognizer 30 for another one would require that another plurality of confusion sets particular to the new recognizer be loaded into database. This loading may be done through data input device 50; alternatively, reference database 35 may be programmed with several groups of confusion sets, each group associated with a different recognizer; so that when one recognizer is replaced for another, a mere command entered through device 50 can activate the group of confusion sets corresponding to the new recognizer.

Figure 5B:
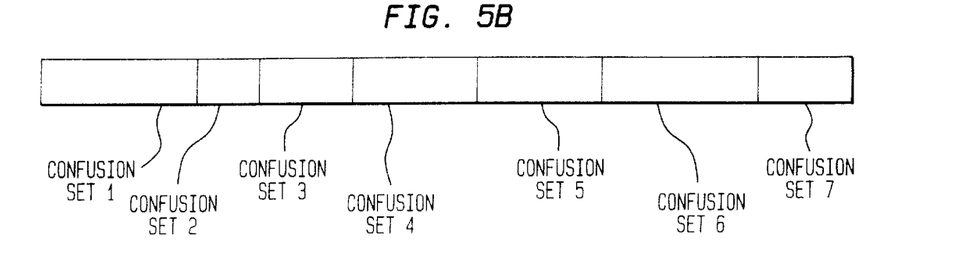

As an alternative to the index code format of FIG. 5(a), FIG. 5(b) illustrates an index code having variable-length segments. Although composed of only binary digits 1 and 0, the various segments of FIG. 5(b) are not encoded according to the binary decimal system. Instead, the number of ones in a particular segment equals the number of letters of the associated confusion set that is present in an associated name. Thus, returning to the name BROWN, since no letters of the first confusion set of FIG. 4 appears in this name, the segment for confusion set 1 is 000. Only three bits are needed to encode confusion set 1 because this confusion set includes three letters. As an illustration of the difference between the formats of FIGS. 5(a) and 5(b), reference is made to confusion set 4, of which two letters ("R" and "O") appear in BROWN. In the format of FIG. 5(b), the associated segment would appear as 0011 and not as 0010, as was the case with the index code of FIG. 5(a).

Figure 6:
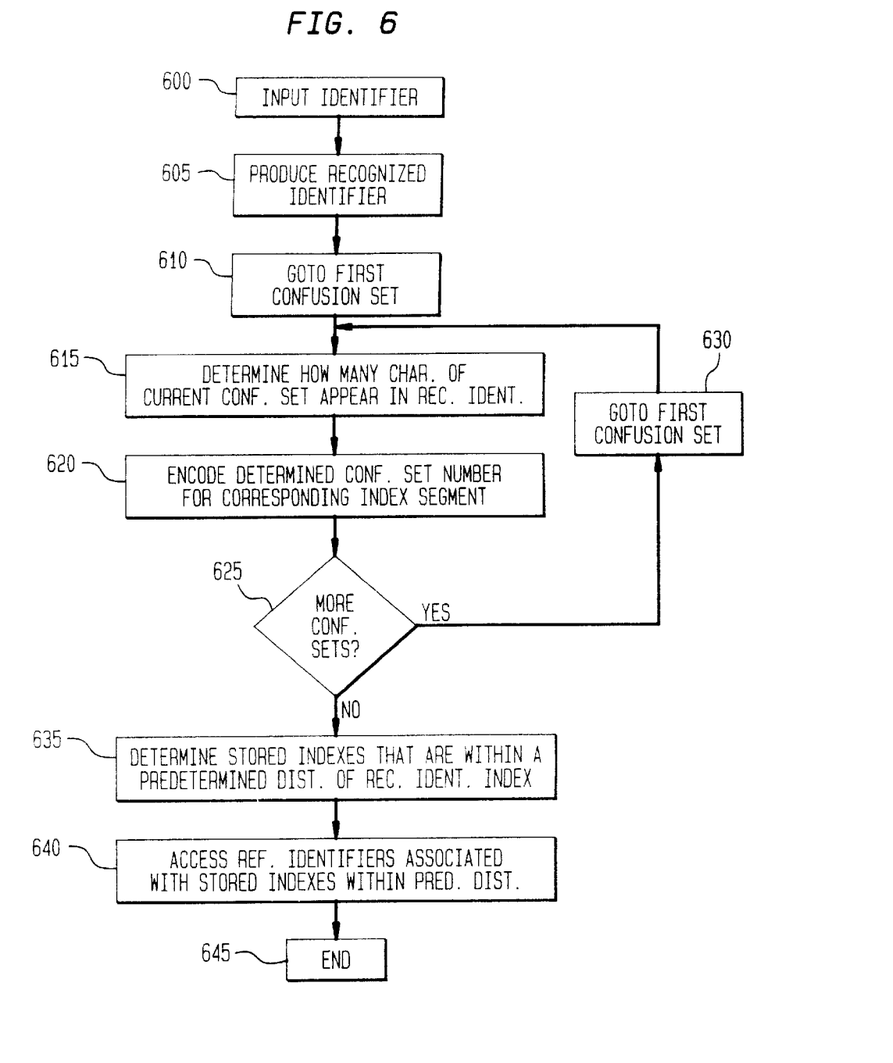
FIG. 6 illustrates a flow diagram for reducing a set of reference identifiers to a candidate subset of reference identifiers.

In order to provide an understanding of the operation of the system of FIG. 1, reference should now be made to the flow diagram of FIG. 6. The flow diagram of FIG. 6 presents an algorithm, maintained in index pruning module 60, under which CPU 40 operates in order to form a subset of identifiers from the contents of reference identifier database 35 on the basis of an input identifier. This subset is used as a list of candidate identifiers that has a high likelihood of including the identifier that correctly matches the input identifier. The algorithm of FIG. 6 begins when a user is prompted by voice prompt device 25 to speak an identifier into voice input/output device 10 (step 600). The user may enter the name or identifier by spelling it out. As explained before, the identifier that is input by the user may be a name, an account number, or any other aggregation of characters. After the input voice signal corresponding to the input identifier is digitized at A/D converter 20, the digitized signal is provided to speech recognizer 30, which provides a recognized output intended to correspond to the input identifier (step 605). At this point, the CPU 40 calculates an index for the recognized identifier. It does so by going to the first confusion set (step 610) and determining how many, if any, characters of the first confusion set appear in the recognized identifier. Next, CPU 40 encodes a segment for the current confusion set; as explained above, the data contents of the segment encode the amount of characters of the current confusion set that appear in the recognized identifier (step 620). If more confusion sets need to be analyzed for the current recognized identifier (step 625), CPU 40 goes to the next confusion set (step 630) and encodes a segment for the current confusion set, this segment encoding the amount of characters of the current confusion set that appears in the recognized identifier (steps 615–620). This process repeats itself until a segment has been encoded for each confusion set; the concatenation of each of these segments yields an index for the recognized identifier.

At this point, it would be a simple matter for CPU 40 to access from database 35 the names that are associated with the index generated for the recognized identifier and determine whether the recognized identifier matches any of the names associated with the accessed index. Because recognizer 30 exhibits a certain, albeit tolerable, degree of inaccuracy, however, a chance exists that the recognized identifier will not exactly match the characters of the input identifier, with the consequence that the index generated for an incorrect recognized identifier may be different than the index that would be determined for a correct recognized identifier. Therefore, if the subset of candidate reference identifiers provided by CPU 40 is to have an acceptably high likelihood of containing the reference identifier that matches the input identifier, CPU 40 must access from reference identifier database 35 not only the identifiers associated with the index that is calculated for the recognized identifier, but also those identifiers that are associated with indices that are within a predetermined data distance of the index of the recognized identifier (step 635). By data distance, what is meant is the degree to which the bit values of one index differ from the individual bit values of another index. For example, if one index has a data content of 0100, and another index has a data content of 0101, aligning their bit positions in the following manner:

0100

0101 reveals that the bit values of one index do not match the bit values in the respective bit positions of the other index in only one bit position. Thus, the data distance between these two indices is one. Had these indices had different bit values in two of their respective bit positions, then the data distance between them would be two. These bit value deviations between indices may also be referred to as errors.

Figure 7:
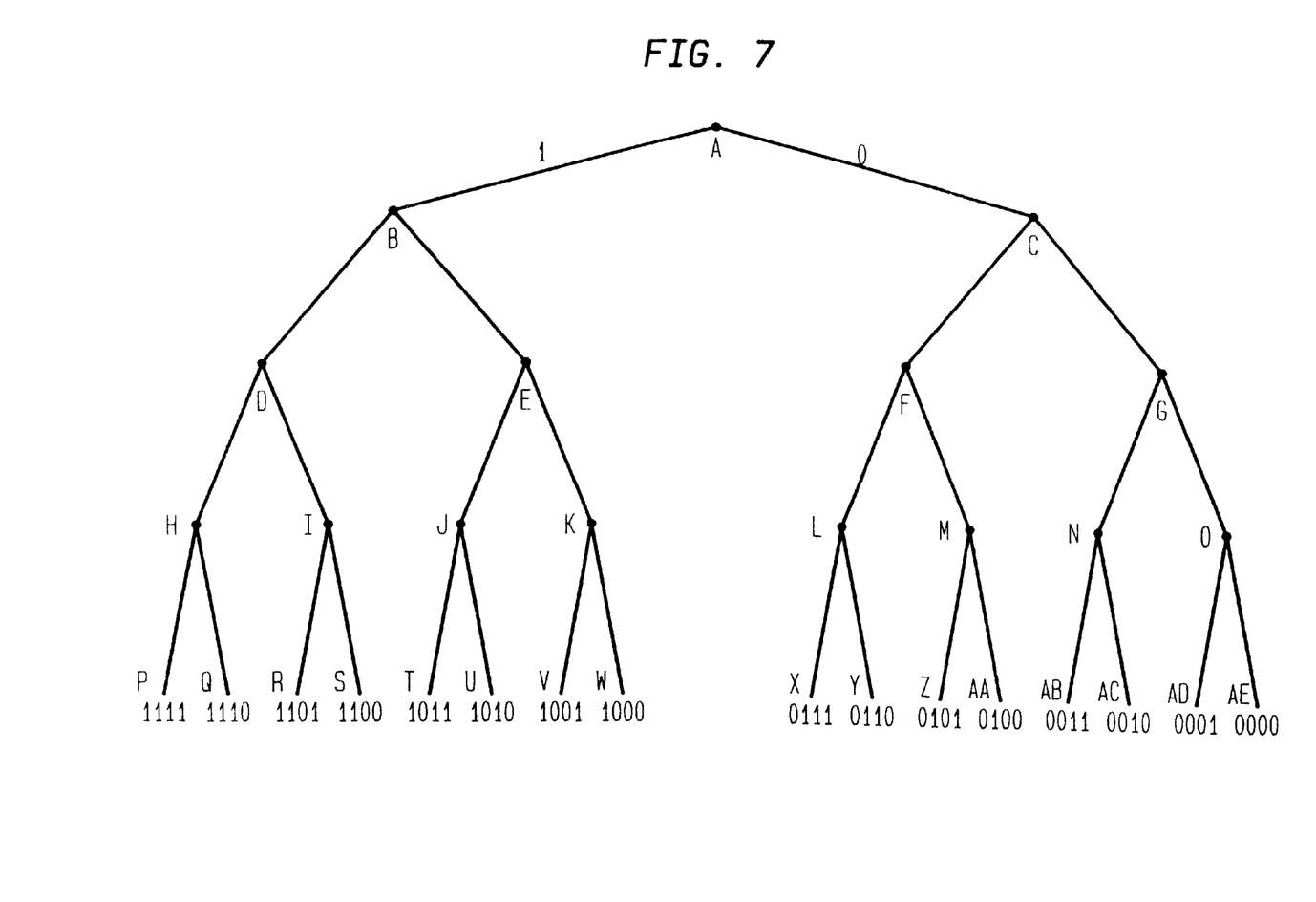
FIG. 7 illustrates an exemplary data structure for arranging the reference index codes maintained in the reference identifier database of FIG. 1.

FIG. 7 illustrates a way to arrange the indices in database 35 in such a way as to facilitate the retrieval of those indices that are within a predetermined data distance of an index of a recognized identifier. In traversing this tree-like data structure, every movement to the left of a particular node counts as a value of "1", and every movement to the right of a particular node counts as a value of "0". For ease of reference, each node has been labeled with a letter. Moreover, for the sake of simplicity, each index code in FIG. 7 is only 4 bits long. Of course, for the confusion set example of FIG. 4, the resulting tree structure for the indices yielded by those confusion sets would be much larger than the one in FIG. 7.

In order to illustrate the use of the tree structure of FIG. 7, assume that the recognized identifier yielded an index of 1011. Also assume that CPU 40 has been programmed to retrieve from reference identifier database 35 all of the indices that are within a bit distance of 0 or 1 of index 1011. CPU 40 begins traversing the tree of FIG. 7 at node A. The branches that lead to the first level of the tree, comprised of nodes B and C, represent the possible values for the first bit position of the indices. Moving to node B yields a bit value of 1, and moving to node C yields a bit value of 0. Since the most significant bit value of the index 1011 is 1, going to node B yields a distance of 0, since the bit values are the same, while moving to node C yields a distance of 1, since the bit values are different.

With respect to node B, moving to the left therefrom to node D produces a distance of 1 so far between the index and this travel path because the travel path to node D has a value of 11, while the first two bits of the index code is 10. Going to node E requires CPU 40 to move to the right from node B, which means that the bit value for this branch is 0. Thus, going to node E still yields a distance of 0 because the value of the travel path from node A to node E, 10, matches the value of the first two bits of the index code 1011. With respect to node C, going to node F yields a travel path value of 01, which already yields a distance of 2 with respect to the index code 1011 because each of the first two bit values of the index code differs from the associated bit value of the travel path value to node F. Since the distance of 2 exceeds the predetermined distance limit of 1, any index code leading from node F will have a distance of at least two from index code 1011. Therefore, any index code leading from node F is eliminated from consideration. This means that in the present example index codes 0111, 0110, 0101, and 0100 are eliminated from consideration. Going from node C to node G yields a travel path value of 00; the difference between the travel path value to node G and the first two bits of index code 1011 is still one. Therefore, further travel from node G is required since the allowable distance with respect to the index code has not yet been exceeded down this particular path.

With respect to node D, going down to node H yields a travel path value of 111, which results in a distance of 1 with respect to the first three bits of index code 101. Going from node D to node I yields a travel path value of 110, which results in a distance of 1 with the first three bits of index code 1011. With respect to node E, going to node J yields a travel path value of 101, which results in a distance of zero with respect to the first three bits of index code 1011, while going to node K yields a travel path value of 100, which results in a distance of 1 with respect to the first three bits of the index code. Going from node H to node P produces a travel path value of 1111, which differs from the index code by only one; therefore, index code 1111 is acceptable. Going to node Q yields a travel path value of 1110, which differs from the index code by two; thus index code 1110 is unacceptable.

From node I, going to node R yield a travel path value of 1101, which results in a difference of 2 with respect to index code 1011. Thus index code 1101 is unacceptable. The same holds true for the travel path value to node S, because index code 1100 differs in three bit positions from index code 1011. The travel path value to node T is 1011, which matches index code 1011. The travel path value to node U is 1010, which is acceptable because it differs from index code 1011 by only one bit position. The travel path to node V is 1001, which also is acceptable since it is only a distance of 1 from index code 1011. The index code represented by the travel path value to node W, however, is unacceptable because this value of 1000 differs by two bit positions from index code 1011.

Turning to nodes N and 0, the travel path value to node AB from node N is 0011. Index code 0011 is thus acceptable because the distance between this code and the code 1011 is only 1. For node AC, the index code corresponding to this travel path value is unacceptable because the values 0010 and 1011 have a distance of two between them. Finally with respect to nodes AD and AE, the travel path values to these nodes yield unacceptable index codes as well.

Returning to FIG. 6, after CPU 40 finishes traversing the tree structure index code arrangement of database 35, it determines that the index codes 1111, 1010, 0011, and 1011 are the only index codes that are within a distance of 1 of the index code of 1011 generated for the recognized identifier (step 635). Next CPU 40 accesses the reference identifiers that are associated with the codes 1111, 1010, 0011, and 1011 (step 640). The identifiers from these accessed index codes form a candidate set from which a reference identifier matching the recognized identifier is selected. This selection may be done according to any suitable method. For example, if the candidate set is small enough, the user who entered the input identifier may be prompted with each of the candidate reference identifiers until the user confirms that a match exists. By reducing in this manner the number of reference identifiers that must be compared with the recognized identifier in order to find a match, the present invention improves the accuracy of the reference identifier retrieval process and at the same time reduces the computation time that is necessary to determine a match with the recognized identifier.

Although the present invention has been presented within the context of a speech recognition system that matches an input identifier with one of a plurality of reference identifiers, it should be appreciated that the present invention is not limited thereto, but instead, is applicable to a wide variety of applications that require a large number of identifiers to be reduced to a smaller, more manageable set of identifiers for further processing.

What is claimed is:

1. A method of matching an input identifier to one of a set of reference identifiers, each of the reference identifiers being associated with one of a plurality of reference index codes, the method comprising the steps of:
    a) providing a recognized identifier, the input identifier being provided by a user; on the basis of the input identifier;
    b) determining an index code for the recognized identifier;
    c) determining which of the plurality of reference index codes are within a predetermined distance of the index code for the recognized identifier;
    d) accessing the reference identifiers associated with the reference index codes determined in step c), the accessed reference identifiers forming a candidate subset of reference identifiers;
    e) searching the candidate set of reference identifiers for a reference identifier that matches the recognized identifier; and
    g) selecting a matching reference identifier as corresponding to the input identifier, wherein each reference identifier is a set of alphanumeric characters.

2. The method according to claim 1, wherein the step b) comprises:
    i) providing a plurality of confusion sets; and
    ii) determining the index code for the recognized identifier on the basis of the recognized identifier and the plurality of confusion sets.

3. The method according to claim 2, wherein each one of the input identifier, the recognized identifier, and the plurality of reference identifiers comprise at least one character selected from a plurality of characters.

4. The method according to claim 3, wherein the step i) comprises:
    iii) obtaining, for each one of the plurality of characters, a plurality of recognition values, each recognition value representing a likelihood that one of the plurality of characters is recognized as another one of the plurality of characters; and
    iv) dividing the plurality of characters into a plurality of subsets of characters, each subset of characters including characters having a recognition value of being recognized as another character of the same subset that is higher than a predetermined threshold, wherein each of the confusion sets corresponds to one of the subsets of characters.

5. The method according to claim 2, wherein each one of the plurality of reference index codes and the index code for the recognized identifier comprises a plurality of segments, each segment comprising a predetermined number of bits, wherein each segment is associated with one of the plurality of confusion sets.

6. The method according to claim 5, wherein the step ii) comprises:
    iii) determining, for each confusion set, an amount of characters of the confusion set appearing in the recognized identifier; and
    iv) encoding, for each segment, the amount of characters of the associated confusion set determined in step iii) appearing in the recognized identifier.

7. The method according to claim 1, wherein the recognized identifier is entered by the user speaking into a voice input device.

8. A method of matching an input identifier to one of a set of reference identifiers, each of the reference identifiers being associated with one of a plurality of reference index codes, the method comprising the steps of:
    a) providing a recognized identifier on the basis of the input identifier;
    b) determining an index code for the recognized identifier;
    c) determining which of the plurality of reference index codes are within a predetermined distance of the index code for the recognized identifier;
    d) accessing the reference identifiers associated with the reference index codes determined in step c), the accessed reference identifiers forming a candidate subset of reference identifiers;
    e) searching the candidate set of reference identifiers for a reference identifier that matches the recognized identifier; and
    g) selecting a matching reference identifier as corresponding to the input identifier wherein the step c) comprises:
        i) arranging the reference index codes into a predetermined data structure, wherein the predetermined data structure comprises a plurality of nodes, each node representing at least a portion of at least one of the plurality of reference index codes;
        ii) traversing the predetermined data structure, wherein moving from any one of the nodes to another node along a first predetermined direction represents a first value, and wherein moving from any one of the nodes to another node along a second predetermined direction represents a second value;
        iii) calculating a travel path value for each node based on at least one of the first predetermined value and the second predetermined value, each reference index code being associated with a corresponding travel path value;
        iv) comparing a value of each bit position of each travel path value with a value of each corresponding bit position of the index code for the reference identifier;
        v) determining for each travel path value an amount of bit positions having a different value than those in corresponding bit positions of the index code for the recognized identifier; and
        vi) including in a candidate set of reference index codes those reference index codes associated with travel path values for which the associated amount of bit positions having a different value than the corresponding bit positions of the index code for the recognized identifier is no more than the predetermined distance.

9. The method according to claim 8, wherein the predetermined data structure comprises a tree data structure.

10. An apparatus for matching an input identifier to one of a set of reference identifiers, each of the reference identifiers being associated with one of a plurality of reference index codes, the apparatus comprising:

a) first means for providing a recognized identifier on the basis of the input identifier;
b) first means for determining an index code for the recognized identifier, the input identifier being provided by a user;
c) second means for determining which of the plurality of reference index codes are within a predetermined distance of the index code for the recognized identifier;
d) means for accessing the reference identifiers associated with the reference index codes determined by the second means for determining, the accessed reference identifiers forming a candidate subset of reference identifiers;
e) means for searching the candidate set of reference identifiers for a reference identifier that matches the recognized identifier; and
f) means for selecting a matching reference identifier as corresponding to the input identifier, wherein each reference identifier is a set of alphanumeric characters.

11. The apparatus according to claim 10, wherein the first means for determining comprises:
   i) means for providing a plurality of confusion sets; and
   ii) third means for determining the index code of the recognized identifier on the basis of the recognized identifier and the plurality of confusion sets.

12. The apparatus according to claim 11, wherein each one of the input identifier, the recognized identifier, and the plurality of reference identifiers comprises at least one character selected from a plurality of characters.

13. The apparatus according to claim 12, wherein the second means for providing comprises:
   iii) means for obtaining, for each one of the plurality of characters, a plurality of recognition values, each recognition value representing a likelihood that one of the plurality of characters is recognized as another one of the plurality of characters; and
   iv) means for dividing the plurality of characters into a plurality of subsets of characters, each subset of characters including characters having a recognition value of being recognized as another character of the same subset that is higher than a predetermined threshold, wherein each of the confusion sets corresponds to one of the subsets of characters.

14. The apparatus according to claim 11, wherein each one of the plurality of reference index codes and the index code for the recognized identifier comprises a plurality of segments, each segment comprising a predetermined number of bits, wherein each segment is associated with one of the plurality of confusion sets.

15. The apparatus according to claim 14, wherein the third means for determining comprises:
   iii) fourth means for determining, for each confusion set, an amount of characters of the confusion set appearing in the recognized identifier; and
   iv) means for encoding, for each segment, the amount of characters of the associated confusion set determined by the third means for determining to appear in the recognized identifier.

16. The apparatus according to claim 10, wherein the second means for determining comprises:
   i) means for arranging the reference index codes into a predetermined data structure, wherein the predetermined data structure comprises a plurality of nodes, each node representing at least a portion of at least one of the plurality of reference index codes;
   ii) means for traversing the predetermined data structure, wherein moving from any one of the nodes to another node along a first predetermined direction represents a first value, and wherein moving from any one of the nodes to another node along a second predetermined direction represents a second value;
   iii) means for calculating a travel path value for each node based on at least one of the first predetermined value and the second predetermined value, each reference index code being associated with a corresponding travel path value;
   iv) means for comparing a value of each bit position of each travel path value with a value of each corresponding bit position of the index code for the reference identifier;
   v) third means for determining for each travel path value an amount of bit positions having a different value than those in corresponding bit positions of the index code for the recognized identifier; and
   vi) means for including in a candidate set of reference index codes those reference index codes associated with travel path values for which the associated amount of bit positions having a different value than the corresponding bit positions of the index code for the recognized index code is no more than the predetermined distance.

17. The apparatus according to claim 16, wherein the predetermined data structure comprises a tree data structure.

18. An apparatus, comprising:
   a processing device;
   a recognizing device coupled to the processing device, the recognizing device including an input for receiving an input identifier, the input identifier being provided by a user;
   a reference identifier database coupled to the processing device, the reference identifier database including at least one reference identifier, each reference identifier being associated with one of a plurality of reference index codes;
   an index pruning module coupled to the processing device;
   a confusion matrix memory coupled to the processing device; and
   a confusion set generating module coupled to the processing device.

19. The apparatus according to claim 18, further comprising:
   a data input device coupled to the processing device; and
   a display device coupled to the processing device.

\* \* \* \* \*